(12) United States Patent  
Dong (10) Patent No.: US 12,126,575 B2
(45) Date of Patent: Oct. 22, 2024

(54) RECEIVING STATE FEEDBACK METHOD AND DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 389 days.

(21) Appl. No.: 17/620,662

(22) PCT Filed: Jun. 20, 2019

(86) PCT No.: PCT/CN2019/092076
§ 371 (c)(1),
(2) Date: Dec. 17, 2021

(87) PCT Pub. No.: WO2020/252741
PCT Pub. Date: Dec. 24, 2020

(65) Prior Publication Data
US 2022/0247545 A1    Aug. 4, 2022

(51) Int. Cl.
*H04L 5/00* (2006.01)
*H04W 84/12* (2009.01)

(52) U.S. Cl.
CPC .......... *H04L 5/0094* (2013.01); *H04L 5/0044* (2013.01); *H04W 84/12* (2013.01)

(58) Field of Classification Search
None
See application file for complete search history.

(56) References Cited

U.S. PATENT DOCUMENTS

| 2017/0111951 | A1 | 4/2017 | Chu et al. |
| 2018/0138959 | A1 | 5/2018 | Chun et al. |
| 2018/0184233 | A1 | 6/2018 | Alpert et al. |
| 2024/0008095 | A1* | 1/2024 | Ahn ............... H04W 72/21 |

FOREIGN PATENT DOCUMENTS

| CN | 101882982 A | 11/2010 |
| CN | 103561449 A | 2/2014 |
| CN | 105024787 A | 11/2015 |
| CN | 105611538 A | 5/2016 |

(Continued)

OTHER PUBLICATIONS

First Office Action of Chinese Application No. 201980001122.3 dated Sep. 29, 2022 with English translation, (17p).

(Continued)

*Primary Examiner* — Walter J Divito
(74) *Attorney, Agent, or Firm* — Arch & Lake LLP (57) ABSTRACT

A receiving state feedback method, comprising: receiving, by a receiving terminal in a Wi-Fi network, data frames simultaneously sent by a transmission terminal in n frequency bands, n>1; generating a feedback information frame according to the receiving states of receiving respective data frames in n frequency bands, the feedback information frame including at least n sets of preset bits, and the n sets of preset bits being used for indicating receiving states of receiving the respective the data frames in the n frequency bands; and sending the feedback information frame to the transmission terminal.

18 Claims, 3 Drawing Sheets

---

Receive data frames simultaneously sent by a transmission terminal in n frequency bands, wherein n>1 — S1

Generate a feedback information frame according to receiving states of receiving respective data frames in the n frequency bands, wherein the feedback information frame comprises at least n sets of preset bits, and the n sets of preset bits are configured to indicate the receiving states of receiving the respective data frames in the n frequency bands — S2

Send the feedback information frame to the transmission terminal — S3

(56) References Cited

FOREIGN PATENT DOCUMENTS

| CN | 106656429 A | 5/2017 |
|---|---|---|
| CN | 107104769 A | 8/2017 |
| CN | 107294665 A | 10/2017 |
| CN | 107925990 A | 4/2018 |
| CN | 108650037 A | 10/2018 |
| CN | 109417546 A | 3/2019 |
| CN | 110830175 A | 2/2020 |
| EP | 3940977 A1 | 1/2022 |
| WO | 2010066067 A1 | 6/2010 |
| WO | 2019056369 A1 | 3/2019 |
| WO | 2020112020 A1 | 6/2020 |

OTHER PUBLICATIONS

Partial Supplementary European Search Report of EP Application No. 19934220.5 dated Dec. 15, 2022, (16p).
Extended European Search Report issued in Application No. 19934220.5, dated Mar. 16, 2023,(20p).
Ming Gan(HUawei) et al., "Association Exchange using Contention based UI OFDMA", 802.11-17/0396 r3, Date: Mar. 1, 2017, (15p).
International Search Report of PCT/CN2019/092076 dated Mar. 20, 2020 with English translation, (4p).
Notice of Allowance issued in CN application No. 2019800011223 dated Apr. 3, 2024 with English translation, (6p).
Lin Ke-wen et al., "Wireless Real-time Video Transmission System Based on Multi-link Aggregation," Journal of Chinese Computer Systems, vol. 32 No. 5, May 2011, (8p).
Lan Man Standards Committee of the IEEE Computer Society, "Draft Standard for Local and Metropolitan Area Networks—Link Aggregation," IEEE P802.1AX-REV™/D4.1, Jun. 19, 2014, (315p).

\* cited by examiner

RECEIVING STATE FEEDBACK METHOD AND DEVICE

CROSS-REFERENCE TO RELATED APPLICATION

The present application is the U.S. national phase application of International Application No. PCT/CN2019/092076, filed on Jun. 20, 2019, the content of which is incorporated hereby in its entirety for all purposes.

TECHNICAL FIELD

The present disclosure relates to the field of communication technology, and in particular, to a receiving state feedback method, a receiving state feedback apparatus, an electronic device, and a computer-readable storage medium.

BACKGROUND

In the existing Wi-Fi technology, after receives a data frame sent by a transmission terminal, a receiving terminal will feed back information to the transmission terminal, so that the transmission terminal can determine a receiving state of the receiving terminal for the data frame.

However, at present, the information fed back from the receiving terminal to the transmission terminal is only applicable to the case that the transmission terminal sends the data frame to the receiving terminal in a single frequency band, and it is not applicable to the case that the transmission terminal sends the data frame to the receiving terminal in a plurality of frequency bands at the same time and it's impossible to make the transmission terminal determine the receiving state of the receiving terminal for the data frame.

SUMMARY

According to a first aspect of the present disclosure, there is provided a receiving state feedback method applied to a receiving terminal in a Wi-Fi network. The receiving state feedback method may include receiving data frames simultaneously sent by a transmission terminal in n frequency bands, n is an integer and n>1; generating a feedback information frame according to receiving states of receiving respective data frames in the n frequency bands, the feedback information frame includes at least n sets of preset bits, and the n sets of preset bits are configured to indicate the receiving states of receiving the respective data frames in the n frequency bands; and sending the feedback information frame to the transmission terminal.

According to a second aspect of the disclosure, there is provided an electronic device. The electronic device may include: a processor and memory for storing instructions executable by the processor; wherein the processor is configured to implement the receiving state feedback method according to the first aspect of the disclosure.

According to a third aspect of the disclosure, there is provided a non-transitory computer-readable storage medium with a computer program stored thereon, wherein when the computer program is executed by a processor, the processor implements steps in the receiving state feedback method according to the first aspect of the disclosure.

It is to be understood that the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The present disclosure proposes a receiving state feedback method, a receiving state feedback apparatus, an electronic device, and a computer-readable storage medium to solve the technical problem that, in the related art, in case that the transmission terminal simultaneously sends data frames to the receiving terminal in multiple frequency bands, the information fed back by the receiving terminal to the transmission terminal cannot enable the transmission terminal to determine the receiving states of the receiving terminal for the data frames.

Figure 1:
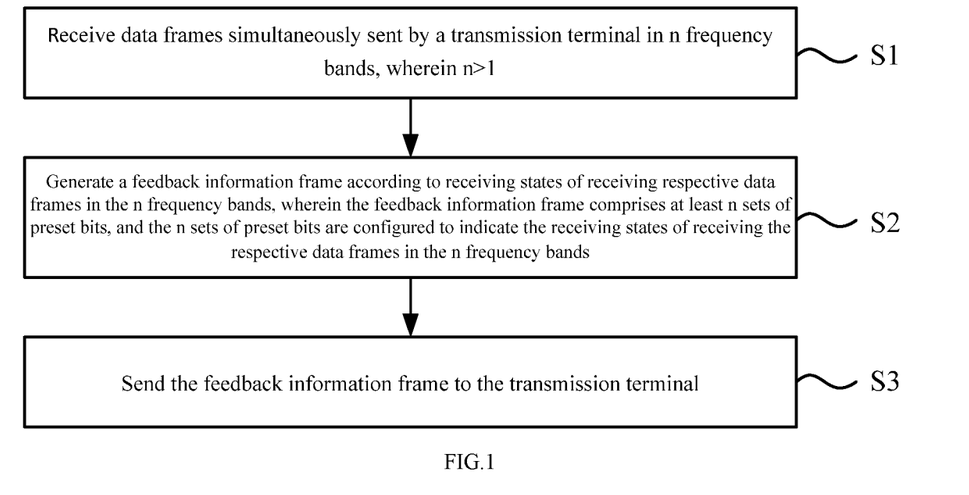
FIG. 1 is a schematic flowchart showing a receiving state feedback method according to one or more examples of the present disclosure.

FIG. 1 is a schematic flowchart showing a receiving state feedback method according to an example of the present disclosure. The receiving state feedback method shown in the example of the present disclosure may be applicable to a receiving terminal in a Wi-Fi network, wherein the receiving terminal may be a wireless access point (AP), such as a router. Furthermore, the receiving terminal can also be a station (STA), such as mobile phones, tablets, wearable devices, and other electronic devices. For example, when a wireless access point sends data frames to a station, the wireless access point serves as the transmission terminal and the station serves as the receiving terminal. Meanwhile, when a station sends data frames to a wireless access point, the station serves as the transmission terminal and the wireless access point serves as the receiving terminal.

As shown in FIG. 1, the receiving state feedback method applied to a receiving terminal in a Wi-Fi network may include the following steps.

In step S1, data frames simultaneously sent by a transmission terminal in n frequency bands is received, wherein n>1.

In step S2, a feedback information frame is generated according to receiving states of receiving respective data frames in the n frequency bands, wherein the feedback information frame includes at least n sets of preset bits, and the n sets of preset bits are used to indicate the receiving states of receiving the respective data frames in the n frequency bands.

In step S3, the feedback information frame is sent to the transmission terminal.

In one example, the transmission terminal may simultaneously send data frames to the receiving terminal in n frequency bands in case that the n frequency bands are aggregated. For example, when the transmission terminal needs to send a video to the receiving terminal, the video can be divided into n parts, and then respectively send n parts in n frequency bands at the same time, so that the n parts can be sent to the receiving terminal together. Furthermore, each of the n parts has a small amount of data relative to the original video, so the time required for transmission in each frequency band is less, so that the entire video can be sent to the receiving terminal faster. The n frequency bands may include, but are not limited to, 2.4 GHz frequency band, 5.8 GHz frequency band, and 6-7 GHz frequency band, and data frames sent in each frequency band can be different, so that the speed of sending and receiving the data frames can be increased. Also, data frames sent in each frequency band can be the same, so that the success rate of receiving the data frame can be improved.

According to the example of the present disclosure, the transmission terminal sends data frames to the receiving terminal in n frequency bands at the same time, and the receiving terminal can receive the data frames sent by the transmission terminal in n frequency bands at the same time, and then based on receiving states of receiving respective data frames in the n frequency bands, a feedback information frame including at least n sets of preset bits can be generated. The feedback information frame includes at least n sets of preset bits, and the n sets of preset bits record the receiving states of receiving a corresponding data frame in each of the n frequency bands, so that the transmission terminal can determine the receiving states of the receiving terminal for the corresponding data frame of each of the n frequency bands.

Figure 2:
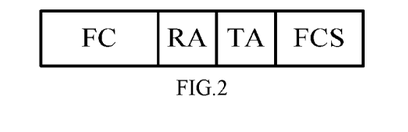
FIG. 2 is a schematic diagram of information fed back from a receiving terminal to a transmission terminal in the related art.

FIG. 2 is a schematic diagram of information fed back from a receiving terminal to a transmission terminal in the related art.

In related technologies, the transmission terminal sends a data frame to the receiving terminal in only one frequency band at the same time. As shown in FIG. 2, information fed back from the receiving terminal to the transmission terminal may include a frame control (FC) field, a receiver address (RA) field, a transmitter address (TA) field, and a frame check sequence (FCS) field.

Specifically, in the related art, the receiving terminal records the receiving state for the data frame in the FC field, so that after receiving the feedback information, the transmission terminal can determine the receiving state of the receiving terminal for the data frame based on the FC field. However, due to the limited number of bits in the FC field and the FC field needs to record other information, the prior art method of recording the receiving state in the FC field can only record very little information, which is only suitable for the case where the transmission terminal sends data frame to the receiving terminal in only one frequency band at the same time (that is, when fewer bits are required), but it is not suitable for the case where the transmission terminal sends data frames to the receiving terminal in n frequency bands at the same time (that is, when more bits are required).

According to the example of the present disclosure, the transmission terminal sends data frames to the receiving terminal in n frequency bands at the same time, and the receiving terminal can receive the data frames sent by the transmission terminal in n frequency bands at the same time. Next, the feedback information frame including at least n sets of preset bits can be generated based on the receiving states for the corresponding data frame in each of the n frequency bands, and the n sets of preset bits in the feedback information frame respectively record a receiving state for the corresponding data frame in each of the n frequency bands, so that the transmission terminal can determine the receiving state of the receiving terminal for the corresponding data frame in each of the n frequency bands.

The transmission terminal can determine subsequent operations according to the determined receiving states. For example, if it is determined that the receiving terminal fails to receive a corresponding data frame in a certain frequency band, then the corresponding data frame can be re-sent to the receiving terminal subsequently.

Figure 3:
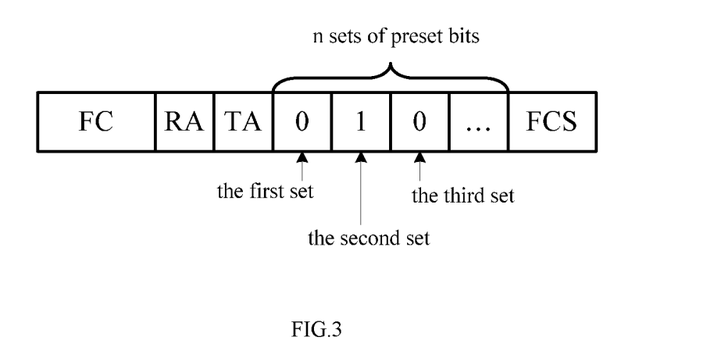
FIG. 3 is a schematic diagram showing a feedback information frame according to one or more examples of the present disclosure.

FIG. 3 is a schematic diagram showing a feedback information frame according to an example of the present disclosure.

As shown in FIG. 3, when each set preset bits of the n sets of preset bits includes one preset bit, then the feedback information frame may include n preset bits, and a value of each of the n preset bits may be '0' or '1', wherein '1' can be used to indicate that the receiving state for the data frame is successful (for example, the data frame is received), and '0' can be used to indicate that the receiving state for the data frame is failed (for example, the data frame is not received), so that the n preset bits can indicate the receiving states of receiving the data frame in n frequency bands.

For example, the i-th preset bit of the n preset bits may be used to indicate a receiving state of receiving the data frame in the i-th frequency band (for example, the frequency band with an identification number or a sequence number of i). As shown in FIG. 3, the value of the first preset bit is 0, which can indicate that the receiving state of receiving the data frame in the first frequency band is failed. The value of the second preset bit is 1, which can indicate that the receiving state of receiving the data frame in the second frequency band is successful. The value of the third preset bit is 0, which can indicate that the receiving state of receiving the data frame in the third frequency band is failed, and so on. Therefore, the n preset bits can indicate the receiving states of receiving respective data frames in the n frequency bands. Therefore, after receiving the feedback information frame, the transmission terminal can determine the receiving states of receiving the data frame in the n frequency bands according to n preset bits.

Furthermore, when the length of the n sets of preset bits is less than an integer multiple of 8, additional bits with a value of 0 can be supplemented to make the sum of the preset bits and the additional bits is equal to an integer multiple of 8. That is, the sum of the preset bits and the additional bits is an integer multiple of one byte length, and other fields in the feedback information frame are also an integer multiple of one byte length, so it is convenient for transmission. For example, in the example shown in FIG. 3, the length of the n sets of preset bits is 3, which are used to indicate the receiving states of receiving respective data frames in 3 frequency bands. The length is 3, which is less than an integer multiple of 8, and can be supplemented with 5 additional bits. For example, n sets of preset bits are specifically "010", and the 5 additional bits are '00000', then the preset bits and the additional bits are combined to be "01000000", which indicates that, the receiving state of the data frame is failed in the first frequency band and the third frequency band, and the receiving state of the data frame is successful in the second frequency band.

It should be noted that the n sets of preset bits can be located between the TA field and the FCS field as shown in FIG. 3, or can be set to shift to other positions as required.

In addition to the FC field, RA field, TA field, and FCS field as shown in FIG. 3, the feedback information frame may also include other fields as required.

Among them, in the feedback information frame, the FC field can be used to indicate information, such as a type of feedback information frame and so on, the RA field can be used to indicate a receiving address of the device receiving the feedback information frame, and the TA field can be used to indicate the sending address of the device sending the feedback information frame. For example, when the receiving terminal sends the feedback information frame to the transmission terminal, the RA field can record the address of the transmission terminal, the TA field can record the address of the receiving terminal, and the FCS field can play a role of verification.

In some examples, each set preset bits includes one preset bit, and the i-th preset bit among the n preset bits is used to indicate the receiving state of receiving a corresponding data frame in the i-th frequency band of the n frequency bands, wherein $1 \leq i \leq n$.

In an example, the receiving terminal and the transmission terminal may pre-appoint that a value of the i-th preset bit among the n preset bits in the feedback information frame is related to the receiving state of receiving the data frame in the i-th frequency band of the n frequency bands. Then, the receiving terminal can indicate, through the i-th preset bit among the n preset bits, the receiving state of receiving the data frame in the i-th frequency band of the n frequency bands to the transmission terminal. For example, as shown in FIG. 3, the first preset bit is used to indicate the receiving state of receiving the data frame in the first frequency band, the second preset bit is used to indicate the receiving state of receiving the data frame in the second frequency band, and the third preset bit is used to indicate the receiving state of receiving the data frame in the third frequency band.

Accordingly, n preset bits can be used to indicate receiving states of receiving respective data frames in n frequency bands, so that the n sets of preset bits only include n preset bits, and the preset bits contained in the feedback information frame is fewer bits, which is beneficial to reduce the data volume of the feedback information frame, so as to reduce the communication burden of the receiving terminal sending the feedback information frame to the transmission terminal.

In some examples, the data frame includes k segments of sub-data frames, and the transmission terminal sends the k segments of sub-data frames in k times;

In this case, each set preset bits of the n sets of preset bits includes k preset bits, and the k preset bits in the i-th set preset bits of the n sets of preset bits are used to respectively indicate the receiving state of receiving a corresponding sub-data frame of the k segments of sub-data frames in the i-th frequency band in the n frequency bands, wherein $k > 1$, $1 \leq i \leq n$.

Figure 4:
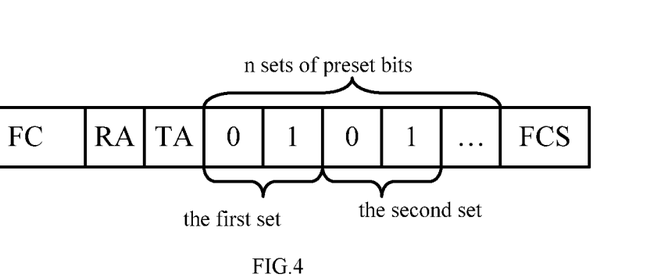
FIG. 4 is a schematic diagram showing another feedback information frame according to one or more examples of the present disclosure.

FIG. 4 is a schematic diagram showing another feedback information frame according to an example of the present disclosure.

In an example, the transmission terminal may divide the data frame sent in each frequency band into k segments of sub-data frames, and then send the k segments of sub-data frames to the receiving terminal in k times in each frequency band, and actions of sending sub-data frame are simultaneous in each frequency band.

In this case, in the feedback information frame generated by the receiving terminal, each set preset bits may include k preset bits, and then the k preset bits in the i-th set of the n sets of preset bits can respectively indicate receiving states of receiving a sub-data frame segment of k segments of sub-data frames in the i-th frequency band of n frequency bands, so that the transmission terminal is capable to determine the receiving state of the receiving terminal for the corresponding sub-data frame in each of the n frequency bands, based on the feedback information frame.

For example, the data frame sent by the transmission terminal in each frequency band each includes 2 sub-data frames, then as shown in FIG. 4, each of n sets of preset bits includes 2 preset bits, that is, k=2. The first preset bit in the first set preset bits is 0, which indicates that the receiving state of receiving the first sub-data frame in the first frequency band is failed, and the second preset bit in the second set preset bits is 1, which indicates that the receiving state of receiving the second sub-data frame in the second frequency band is successful.

It should be noted that, for the k segments of sub-data frames included in the data frame, the specific value of k may be negotiated and determined by the transmission terminal and the receiving terminal, or may be preset by the user of the transmission terminal or the receiving terminal.

In some examples, a first part of preset bits (which may be called a traffic identifier (TID)) in each set preset bits is used to indicate information about a target frequency band where the corresponding data frame is received, and a second part of preset bits in each set preset bits is used to indicate the receiving state of receiving the corresponding data frame in the target frequency band.

Figure 5:
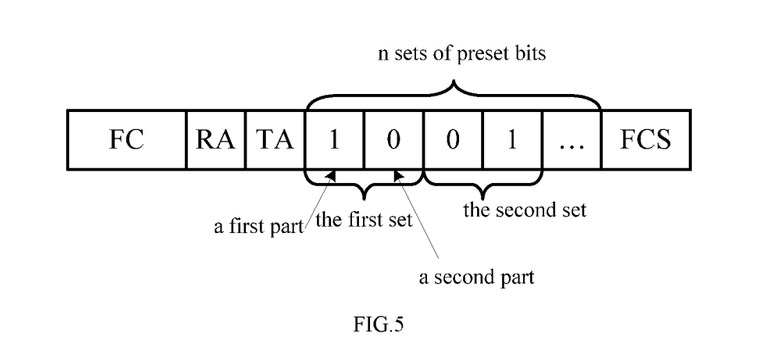
FIG. 5 is a schematic diagram showing yet another feedback information frame according to one or more examples of the present disclosure.

FIG. 5 is a schematic diagram showing yet another feedback information frame according to an example of the present disclosure.

In one example, each of n sets of preset bits can be divided into two parts, a first part of preset bits indicates information about the target frequency band which receives the data frame, and a second part of preset bits indicates the receiving state of receiving the corresponding data frame in the target frequency band. In this case, it is not limited to using the i-th set preset bits to indicate the receiving state of receiving the data frame in the i-th frequency band, but can use any set preset bits to indicate the receiving state of receiving the data frame in the i-th frequency band, which improves the flexibility of setting the feedback information frame.

For example, as shown in FIG. 5, the first part of preset bits and the second part of preset bits may each include one preset bit, wherein the value of the first part of preset bit in the first set preset bits is 1, which can indicate that the target frequency band which receives the data frame is the second frequency band, and the value of the second part of preset bit in the first set preset bits is 0, which can indicate that the receiving state of receiving the data frame in the target frequency band (i.e., the second frequency band) is failed. Accordingly, the value of the first part of preset bit in the second set preset bits is 0, which can indicate that the target frequency band which receives the data frame is the first frequency band, and the value of the second part of preset bit in the second set preset bits is 1, which can indicate that the receiving state of receiving the data frame in the target frequency band (i.e., the first frequency band) is successful.

In some examples, the data frame includes k segments of sub-data frames, and the transmission terminal sends the k segments of sub-data frames in k times.

Wherein, the first part of preset bits includes p preset bits, and the second part of preset bits includes k preset bits, k>1, p≥1.

Figure 6:
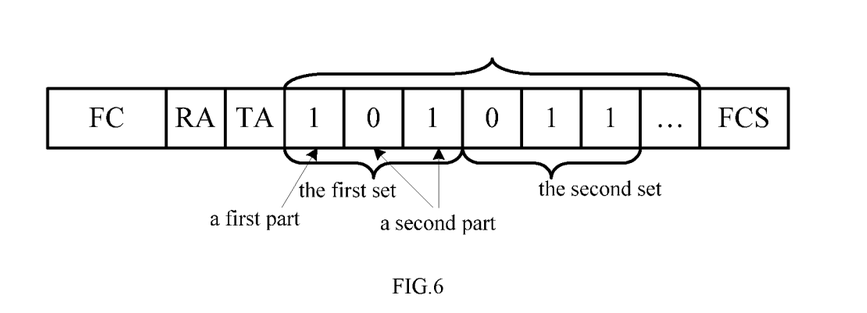
FIG. 6 is a schematic diagram showing yet another feedback information frame according to one or more examples of the present disclosure.

FIG. 6 is a schematic diagram showing yet another feedback information frame according to an example of the present disclosure.

In an example, the transmission terminal may divide the data frame sent in each frequency band into k segments of sub-data frames, and then respectively send the k segments of sub-data frames to the receiving terminal in k times in each frequency band, and actions of sending sub-data frames are simultaneous in each frequency band.

In this case, in the feedback information frame generated by the receiving terminal, the first part of preset bits includes p preset bits, and the second part of preset bits includes k preset bits, that is, using the p preset bits to indicates information about target frequency bands where the corresponding data frame is received, and using the k preset bits to indicate the receiving states of receiving the corresponding data frame in the target frequency bands.

For example, as shown in FIG. 6, the first part of preset bits includes 1 preset bit, and the second part of preset bits includes 2 preset bits. Among them, the value of the first part of preset bit in the first set preset bits is 1, which can indicate that the target frequency band where the data frame is received is the second frequency band, and the value of a first preset bit of the second part of preset bits in the first set preset bits is 0, which can indicate that the receiving state of receiving the first sub-data frame in the target frequency band (i.e., the second frequency band) is failed. Correspondingly, the value of the first part of preset bit in the second set preset bits is 0, which can indicate that the target frequency band where the data frame is received is the first frequency band, and the value of a second preset bit of the second part of preset bits in the second set preset bits is 1, which can indicate that the receiving state of receiving the second sub-data frame in the target frequency band (i.e., the first frequency band) is successful.

Figure 7:
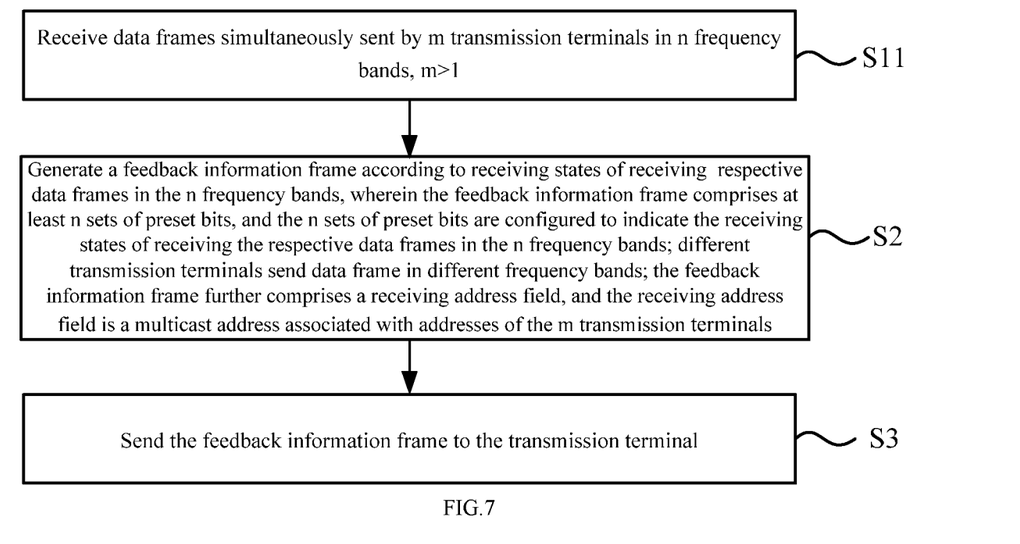
FIG. 7 is a schematic flowchart of another receiving state feedback method according to one or more examples of the present disclosure.

FIG. 7 is a schematic flowchart of another receiving state feedback method according to an example of the present disclosure. As shown in FIG. 7, the step of receiving the data frames simultaneously sent by the transmission terminal in n frequency bands may include following steps.

In step S11, data frames simultaneously sent by m transmission terminals in n frequency bands are received, wherein m>1.

Wherein, the different transmission terminals send data frame in different frequency bands. The feedback information frame further includes a receiving address field, and the receiving address field is a multicast address associated with addresses of the m transmission terminals.

In one example, the transmission terminals simultaneously send data frames to the receiving terminal in n frequency bands, which may mean that m transmission terminals simultaneously send respective data frames to the receiving terminal in n frequency bands, wherein m>1. Specifically, m=n, m>n, or m<n, and different transmission terminals send respective data frames in different frequency bands. In this way, it can avoid that different transmission terminals send data frame in the same frequency band at the same time, which may cause the receiving terminal cannot decode data frames received in this frequency band correctly.

In this case, when the receiving terminal sends a feedback information frame to the transmission terminals, the feedback information frame needs to record information of m transmission terminals. Specifically, the multicast address bits can be recorded, and the multicast address bits are related to m transmission terminals. For example, addresses of m transmission terminals can be encoded to obtain the multicast address bits, then the multicast address bits can be recorded in the RA field, and finally the feedback information frame is send to each of the m transmission terminals.

After receiving the feedback information frame, each of the transmission terminals can determine whether the feedback information frame is the one should be sent to itself by analyzing the multicast address bit in the RA field. If the feedback information frame is not the one should be sent to itself, then the transmission terminal can ignore the feedback information frame. If the feedback information frame is the one should be sent to itself, then the receiving states of receiving the respective data frames by the receiving terminal in the n frequency bands can be determined according to the n sets of preset bits in the feedback information frame.

It should be noted that when only one transmission terminal sends data frames in n frequency bands at the same time, the feedback information frame generated by the receiving terminal may also include a receiving address field. The receiving address field is associated with the address of the transmission terminal simultaneously sending the data frames in the n frequency bands.

In some examples, one of the receiving terminal and the transmission terminal is a wireless access point, and the other is a station.

In some examples, when the wireless access point sends data frames to the station, the wireless access point serves as the transmission terminal and the station serves as the receiving terminal, and when the station sends data frames to the wireless access point, the station serves as the transmission terminal and the wireless access point serves as the receiving terminal.

In some examples, the n frequency bands include at least one of the following: 2.4 GHz band, 5.8 GHz band, and 6-7 GHz band.

It should be noted that the n frequency bands are not limited to the 3 frequency bands mentioned above, and can be set as required.

Corresponding to the foregoing example of the receiving state feedback method, the present disclosure also provides an example of the receiving state feedback apparatus.

Figure 8:
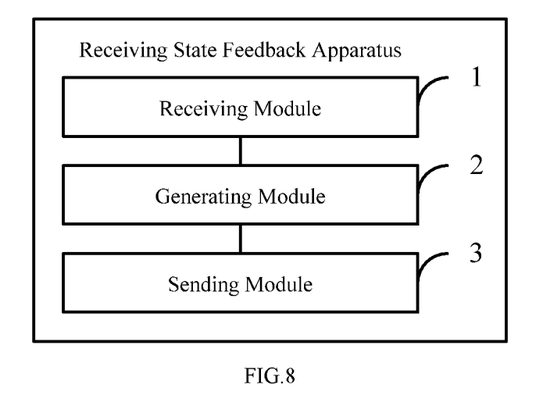
FIG. 8 is a schematic block diagram showing a receiving state feedback apparatus according to one or more examples of the present disclosure.

FIG. 8 is a schematic block diagram showing a receiving state feedback apparatus according to an example of the present disclosure. The receiving state feedback method shown in the examples of the present disclosure may be applicable to the receiving terminal in a Wi-Fi network. Wherein the receiving terminal may be a wireless access point, such as a router, and the receiving terminal may also be a station, such as Mobile phones, tablet computers, wearable devices and other electronic devices.

As shown in FIG. 8, the receiving state feedback apparatus may include a receiving module 1, a generating module 2 and a sending module 3.

The receiving module 1 is configured to receive data frames simultaneously sent by a transmission terminal in n frequency bands, where n>1;

The generating module 2 is configured to generate a feedback information frame according to receiving states of receiving respective data frames in the n frequency bands, wherein the feedback information frame comprises at least n sets of preset bits, and the n sets of preset bits are configured to indicate the receiving states of receiving the respective data frames in the n frequency bands;

The sending module 3 is configured to send the feedback information frame to the transmission terminal.

In some examples, each of the n sets of preset bits comprise one preset bit, and the i-th preset bit among n preset bits is configured to indicate the receiving state of receiving a corresponding data frame in the i-th frequency band in then frequency bands, and $1 \le i \le n$.

In some examples, the data frame comprises k segments of sub-data frames, and the transmission terminal sends the k segments of sub-data frames in k times, wherein, each of the n sets of preset bits comprises k preset bits, and k preset bits in the i-th set preset bits in the n sets of preset bits are configured to respectively indicate a receiving state of receiving a respective sub-data frame of k segments of sub-data frames in the i-th frequency band in the n frequency bands, and wherein k>1 and $1 \le i \le n$.

In some examples, a first part of preset bits in each of the n sets of preset bits is configured to indicate information about a target frequency band where the corresponding data frame is received, and a second part of preset bits in each of the n sets of preset bits is configured to indicate the receiving state of receiving the corresponding data frame in the target frequency band.

In some examples, the data frame comprises k segments of sub-data frames, and the receiving terminal sends the k segments of sub-data frames in k times; wherein, the first part of preset bits comprises p preset bits, and the second part of preset bits comprises k preset bits, and wherein k>1 and $p \ge 1$.

In some examples, the receiving module is configured to receive data frames simultaneously sent by m transmission terminals in n frequency bands, m>1; wherein different transmission terminals send data frame in different frequency bands; the feedback information frame further comprises a receiving address field, and the receiving address field is a multicast address associated with addresses of the m transmission terminals.

In some examples, one of the receiving terminal and the transmission terminal is a wireless access point, and other one of the receiving terminal and the transmission terminal is a station.

In some examples, wherein the n frequency bands comprise at least one of: 2.4 GHz frequency band, 5.8 GHz frequency band, 6-7 GHz frequency band.

Regarding the apparatus in the above-mentioned example, the specific manner in which each module performs the operation has been described in detail in the example of the related method, and will not be elaborated here.

As for the apparatus example, since it basically corresponds to the method example, the relevant part can refer to the part of the description of the method example. The apparatus examples described above are merely illustrative. The modules described as separate components may or may not be physically separated, and the components displayed as modules may or may not be physical modules, that is, they may be located in one place, or it can be distributed to multiple network modules. Some or all of the modules may be selected according to actual needs to achieve the objectives of the solutions of the examples. Those of ordinary skill in the art can understand and implement it without creative work.

The example of the present disclosure also proposes an electronic device, including:
    a processor;
    memory for storing instructions executable by the processor;
    wherein, the processor is configured to implement the receiving state feedback method described in any of the foregoing examples.

The example of the present disclosure also provides a computer-readable storage medium on which a computer program is stored, and when the program is executed by a processor, steps in the receiving state feedback method described in any of the foregoing examples are implemented.

Figure 9:
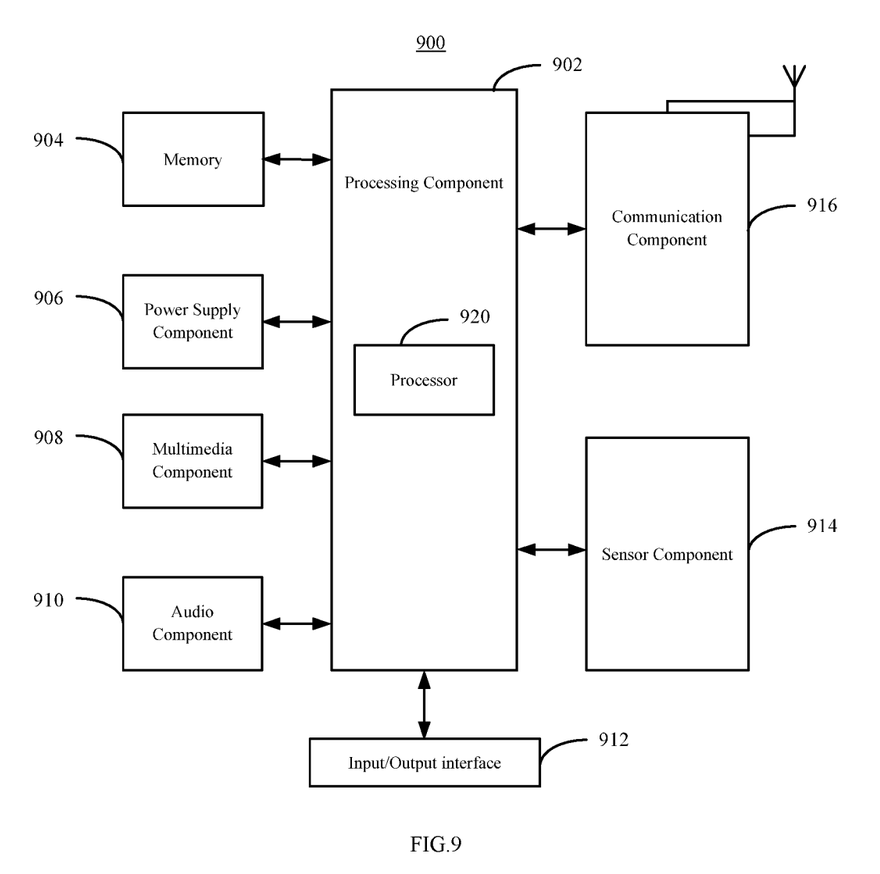
FIG. 9 is a schematic block diagram showing a device for receiving a state feedback according to one or more examples of the present disclosure.

FIG. 9 is a block diagram showing a device 900 for receiving state feedback according to an example of the present disclosure. For example, the device 900 may be a mobile phone, a computer, a digital broadcasting terminal, a messaging device, a game console, a tablet device, a medical device, a fitness device, a personal digital assistant, etc.

Referring to FIG. 9, the device 900 may include one or more of the following components: a processing component 902, a memory 904, a power supply component 906, a multimedia component 908, an audio component 910, an input/output (I/O) interface 912, a sensor component 914, and a communication component 916.

The processing component 902 generally controls the overall operations of the device 900, such as operations associated with displaying, telephone calls, data communication, camera operations, and recording operations. The processing component 902 may include one or more processors 920 to execute instructions to complete all or part of the steps in the above method. In addition, the processing component 902 may include one or more modules to facilitate interaction between the processing component 902 and other components. For example, the processing component 902 may include a multimedia module to facilitate interaction between the multimedia component 908 and the processing component 902.

The memory 904 is configured to store various types of data to support operations at the device 900. Examples of these data include instructions for any application or method operating on the device 900, contact data, phone book data, messages, pictures, videos, and so on. The memory 904 may be implemented by any type of volatile or non-volatile storage device or a combination of the any type of volatile or non-volatile storage device, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 906 provides power to various components of the device 900. The power supply component 906 may include a power supply management system, one or more power supplies, and other components associated with generating, managing, and distributing power for the device 900.

The multimedia component 908 includes a screen that provides an output interface between the device 900 and the user. In some examples, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense a boundary of the touching operation or swiping operation, but also detect a duration and pressure related to the touching operation or swiping operation. In some examples, the multimedia component 908 includes a front camera and/or a rear camera. When the device 900 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 910 is configured to output and/or input audio signals. For example, the audio component 910 includes a microphone (MIC). When the device 900 is in an operation mode, such as a call mode, a recording mode, and a voice recognition mode, the microphone is configured to receive an external audio signal. The received audio signal may be further stored in the memory 904 or transmitted via the communication component 916. In some examples, the audio component 910 further includes a speaker for outputting audio signals.

The I/O interface 912 provides an interface between the processing component 902 and a peripheral interface module. The peripheral interface module may be a keyboard, a click wheel, a button and so on. These buttons may include, but are not limited to: home button, volume button, start button, and lock button.

The sensor assembly 914 includes one or more sensors for providing the status assessment of various aspects for the device 900. For example, the sensor component 914 can detect the on/off state of the device 900, and the relative positioning of the components, for example, the component is a display and a keypad of the device 900, and the sensor component 914 can also detect the position change of the device 900 or a component of the device 900, the presence or absence of user contact with the device 900, the orientation or acceleration/deceleration of the device 900, and the temperature change of the device 900. The sensor assembly 914 may include a proximity sensor configured to detect the presence of nearby objects without any physical contact. The sensor assembly 914 may also include a light sensor, such as a CMOS or CCD image sensor, for use in imaging applications. In some examples, the sensor assembly 914 may also include an acceleration sensor, a gyro sensor, a magnetic sensor, a pressure sensor, or a temperature sensor.

The communication component 916 is configured to facilitate wired or wireless communication between the device 900 and other devices. The device 900 can access a wireless network based on a communication standard, such as WiFi, 2G, or 3G, or a combination of the communication standard. In an example, the communication component 516 receives a broadcast signal or broadcast related information from an external broadcast management system via a broadcast channel. In an example, the communication component 916 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 900 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the interface display method described in any of the above examples.

In an example, there is also provided a non-transitory computer-readable storage medium including instructions, such as a memory 904 including instructions, which can be executed by the processor 920 of the device 900 to complete the above method. For example, the non-transitory computer-readable storage medium may be ROM, random access memory (RAM), CD-ROM, magnetic tape, floppy disk, optical data storage device, or the like.

According to another aspect of the present disclosure, there is provided a receiving state feedback apparatus applied to a receiving terminal in a Wi-Fi network. The receiving state feedback apparatus may include: a receiving module configured to receive data frames simultaneously sent by a transmission terminal in n frequency bands, where n>1; a generating module configured to generate a feedback information frame according to receiving states of receiving respective data frames in the n frequency bands, wherein the feedback information frame comprises at least n sets of preset bits, and the n sets of preset bits are configured to indicate the receiving states of receiving the respective data frames in the n frequency bands; and a sending module configured to send the feedback information frame to the transmission terminal.

Those skilled in the art will easily think of other examples of the present disclosure after considering the specification and practicing the invention disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the examples are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims It should be noted that in the present disclosure, relationship terms such as first and second are only used to distinguish one entity or operation from another entity or operation, and do not necessarily require or imply that there is any such actual relationship or sequence between these entities or operations. The terms 'include', 'comprise', or any other variants thereof are intended to cover non-exclusive inclusion, so that a process, method, article or device that includes a series of elements includes not only those elements, but also includes other elements that are not explicitly listed or also includes elements inherent to such process, method, article, or device. If there are no more restrictions, the element defined by the sentence "includes a . . . " does not exclude the existence of other identical elements in the process, method, article, or equipment that includes the element.

The methods and apparatus provided by the examples of the present disclosure are described in detail above. Specific examples are used in the present disclosure to illustrate the principles and implementations of the present disclosure. The descriptions of the above examples are only used to help understand the method and the core idea thereof of the present disclosure. At the same time, for those of ordinary skill in the art, according to the ideas of this disclosure, there will be changes in the specific implementation and the scope of the present disclosure. In summary, the content of this specification should not be construed as restrictions on the present disclosure.

What is claimed is:

1. A receiving state feedback method, comprising:
receiving, by a receiving terminal in a Wi-Fi network, data frames simultaneously sent by a transmission terminal in n frequency bands, wherein n is an integer greater than one;
generating a feedback information frame according to receiving states of receiving respective data frames in the n frequency bands, wherein the feedback information frame comprises at least n sets of preset bits, and the at least n sets of preset bits are configured to indicate the receiving states of receiving the respective data frames in the n frequency bands; and
sending the feedback information frame to the transmission terminal,
wherein receiving data frames simultaneously sent by the transmission terminal in n frequency bands comprises:
receiving data frames simultaneously sent by m transmission terminals in n frequency bands, m>1,
wherein different transmission terminals send data frame in different frequency bands,
wherein the feedback information frame further comprises a receiving address field, and
wherein the receiving address field comprises a multicast address associated with addresses of the m transmission terminals.

2. The method according to claim 1, wherein each of the at least n sets of preset bits comprise one preset bit, and an i-th preset bit among n preset bits is configured to indicate the receiving state of receiving a corresponding data frame in an i-th frequency band in then frequency bands, and i is an integer and $1 \le i \le n$.

3. The method according to claim 1, wherein the data frame comprises k segments of sub-data frames, and the transmission terminal sends the k segments of sub-data frames in k times;
wherein, each of the at least n sets of preset bits comprises k preset bits, and k preset bits in an i-th set preset bits in the at least n sets of preset bits are configured to indicate a receiving state of receiving a respective sub-data frame of k segments of sub-data frames in an i-th frequency band in the n frequency bands, and wherein $k>1$ and $1 \le i \le n$.

4. The method according to claim 1, wherein a first part of preset bits in each of the at least n sets of preset bits is configured to indicate information about a target frequency band where a corresponding data frame is received, and a second part of preset bits in each of the at least n sets of preset bits is configured to indicate the receiving state of receiving the corresponding data frame in the target frequency band.

5. The method according to claim 4, wherein the data frame comprises k segments of sub-data frames, and the transmission terminal sends the k segments of sub-data frames in k times;
wherein, the first part of preset bits comprises p preset bits, and the second part of preset bits comprises k preset bits, and wherein $k>1$ and $p \ge 1$.

6. The method according to claim 1, wherein one of the receiving terminal and the transmission terminal is a wireless access point, and the other one of the receiving terminal and the transmission terminal is a station.

7. The method according to claim 1, wherein the n frequency bands comprise at least one of: 2.4 GHz frequency band, 5.8 GHz frequency band, and or 6-7 GHz frequency band.

8. An electronic device, comprising:
a processor;
memory for storing instructions executable by the processor;
wherein the processor is configured to,
receive data frames simultaneously sent by a transmission terminal in n frequency bands, wherein n is an integer greater than one;
generate a feedback information frame according to receiving states of receiving respective data frames in the n frequency bands, wherein the feedback information frame comprises at least n sets of preset bits, and the at least n sets of preset bits are configured to indicate the receiving states of receiving the respective data frames in the n frequency bands; and send the feedback information frame to the transmission terminal, wherein the processor is configured to receive data frames simultaneously sent by m transmission terminals in n frequency bands, m>1, wherein different transmission terminals send data frame in different frequency bands, wherein the feedback information frame further comprises a receiving address field, and wherein the receiving address field comprises a multicast address associated with addresses of the m transmission terminals.

9. The electronic device according to claim 8, wherein each of the at least n sets of preset bits comprise one preset bit, and an i-th preset bit among n preset bits is configured to indicate the receiving state of receiving a corresponding data frame in an i-th frequency band in then frequency bands, and i is an integer and 1≤i≤n.

10. The electronic device according to claim 8, wherein the data frame comprises k segments of sub-data frames, and the transmission terminal sends the k segments of sub-data frames in k times;

wherein, each of the n sets of preset bits comprise k preset bits, and k preset bits in an i-th set preset bits in the at least n sets of preset bits are configured to indicate a receiving state of receiving a respective sub-data frame of k segments of sub-data frames in the i-th frequency band in then frequency bands, and wherein k>1 and 1≤i≤n.

11. The electronic device according to claim 8, wherein a first part of preset bits in each of the at least n sets of preset bits is configured to indicate information about a target frequency band where a corresponding data frame is received, and a second part of preset bits in each of the at least n sets of preset bits is configured to indicate the receiving state of receiving the corresponding data frame in the target frequency band.

12. The electronic device according to claim 11, wherein the data frame comprises k segments of sub-data frames, and the transmission terminal sends the k segments of sub-data frames in k times;

wherein, the first part of preset bits comprises p preset bits, and the second part of preset bits comprises k preset bits, and wherein k>1 and p≥1.

13. The electronic device according to claim 8, wherein one of the receiving terminal and the transmission terminal is a wireless access point, and the other one of the receiving terminal and the transmission terminal is a station.

14. The electronic device according to claim 8, wherein the n frequency bands comprise at least one of: 2.4 GHz frequency band, 5.8 GHz frequency band, or 6-7 GHz frequency band.

15. A non-transitory computer-readable storage medium with a computer program stored thereon, wherein when the computer program is executed by a processor, the processor implements steps in a receiving state feedback method to, wherein the receiving state feedback method is applied to a receiving terminal in a Wi-Fi network and comprises:

receiving data frames simultaneously sent by a transmission terminal in n frequency bands, wherein n is an integer greater than one;

generating a feedback information frame according to receiving states of receiving respective data frames in the n frequency bands, wherein the feedback information frame comprises at least n sets of preset bits, and the at least n sets of preset bits are configured to indicate the receiving states of receiving the respective data frames in the n frequency bands; and sending the feedback information frame to the transmission terminal, wherein receiving data frames simultaneously sent by the transmission terminal in n frequency bands comprises:

receiving data frames simultaneously sent by m transmission terminals in n frequency bands, m>1, wherein different transmission terminals send data frame in different frequency bands, wherein the feedback information frame further comprises a receiving address field, and wherein the receiving address field comprises a multicast address associated with addresses of the m transmission terminals.

16. The non-transitory computer-readable storage medium according to claim 15, wherein each of the at least n sets of preset bits comprise one preset bit, and an i-th preset bit among n preset bits is configured to indicate the receiving state of receiving a corresponding data frame in an i-th frequency band in the n frequency bands, and i is an integer and 1≤i≤n.

17. The non-transitory computer-readable storage medium according to claim 15, wherein the data frame comprises k segments of sub-data frames, and the transmission terminal sends the k segments of sub-data frames in k times;

wherein, each of the at least n sets of preset bits comprise k preset bits, and k preset bits in an i-th set preset bits in the at least n sets of preset bits are configured to respectively indicate a receiving state of receiving a respective sub-data frame of k segments of sub-data frames in an i-th frequency band in the n frequency bands, and wherein k>1 and 1≤i≤n.

18. The non-transitory computer-readable storage medium according to claim 15, wherein a first part of preset bits in each of the at least n sets of preset bits is configured to indicate information about a target frequency band where a corresponding data frame is received, and a second part of preset bits in each of the at least n sets of preset bits is configured to indicate the receiving state of receiving the corresponding data frame in the target frequency band.

* * * * *